United States Patent

Poole et al.

[11] 3,797,854
[45] Mar. 19, 1974

[54] CRASH RESTRAINT AIR GENERATING INFLATION SYSTEM

[75] Inventors: Donald R. Poole, Woodinville; Peter L. Stang, Bellevue; James E. Mars, Vashon; Duane A. Williams, Mercer Island, all of Wash.

[73] Assignee: Rocket Research Corporation, Redmond, Wash.

[22] Filed: June 14, 1971

[21] Appl. No.: 152,897

[52] U.S. Cl.............. 280/150 AB, 23/281, 60/219, 60/220, 149/2, 149/21, 149/35
[51] Int. Cl............................................. B60r 21/10
[58] Field of Search...................... 149/26, 35, 2, 19; 280/150 AB; 102/39; 23/281; 60/219, 220

[56] References Cited
UNITED STATES PATENTS

| | | | |
|---|---|---|---|
| 3,454,436 | 7/1969 | Bedell.................................. | 149/19 |
| 3,532,359 | 10/1970 | Teague......................... | 280/150 AB |
| 3,606,377 | 9/1971 | Martin........................... | 280/150 AB |
| 3,618,981 | 11/1971 | Leising et al................. | 280/150 AB |

Primary Examiner—Benjamin R. Padgett
Attorney, Agent, or Firm—Graybeal, Barnard, Uhlir & Hughes

[57] ABSTRACT

A crash restraint system for an automobile comprising an inflatable bag mounted forward of the automobile passenger seat. A bag inflating device comprising a cluster of gas generating units, each of which has a primary nitrogen generating combustion chamber to produce free nitrogen and other gas products, a second oxygen generating chamber to receive the gas mixture from the first chamber and generate free oxygen and introduce this into the gas mixture, and a tertiary chamber which functions to receive this mixture to react out, filter out and condense out undesired combustion products and also cool the remaining nitrogen-oxygen mixture to provide a "breathable air" inflating system for the bag. Alternately the first and second zones can be combined into a single nitrogen and oxygen generating zone.

In the combustion chamber is a composition made up of an azide (e.g., sodium azide) and an oxidizer (e.g., potassium perchlorate) which upon ignition produces free nitrogen and other combustion products such as sodium oxide, free sodium and potassium chloride. In the second oxygen generating chamber is an oxygen generating composition (e.g., potassium chlorate) that liberates free oxygen into the gaseous mixture from the first combustion chamber. When these first and second zones are combined in a single nitrogen and oxygen generating zone, pellets of the nitrogen generating composition and pellets of the oxygen generating composition are placed together in a single zone or chamber. In the tertiary chamber or zone is a bed of a porous composition (e.g. aluminum oxide granules bonded with boric oxide) that reacts with, condenses and filters out the sodium, sodium oxide and potassium chloride, and permits the free nitrogen and free oxygen mixture to pass therethrough while cooling the same. Thus, the inflating gas mixture is breathable "air."

45 Claims, 2 Drawing Figures

PATENTED MAR 19 1974  3,797,854

DONALD R. POOLE
PETER L. STANG
JAMES E. MARS
DUANE A. WILLIAMS
            INVENTORS.

BY
*Traybeal, Cole & Barnard*
            ATTORNEYS

CRASH RESTRAINT AIR GENERATING INFLATION SYSTEM

BACKGROUND OF THE INVENTION

1. Field of the Invention

This invention relates to a crash restraint system in which a bag is inflated to prevent a passenger in an automobile from being thrown violently against the steering wheel, dashboard or other automobile structure.

2. Description of the Prior Art

There are in th prior art various devices which cause a protective bag to inflate in front of a driver or passenger to cushion him from impact with the steering wheel, dashboard or other vehicle structure. Usually the device is activated by an inertial switch responsive to a crash impact of the automobile. This inertial switch in turn causes an inflating device to quickly inflate the collapsed bag into its inflated position deployed in front of the driver or passenger. Inflating gas is generally supplied either from a source of compressed air or other compressed gas, such as shown in U.S. Pat. No. 3,411,808; U.S. Pat. No. 3,413,031 and a number of other patents in the crash restraint field. However, not only does a compressed gas container add bulk to the system, but there is a safety consideration in carrying highly compressed gas.

Hence, the disclosures of several prior art patents attempt to produce an inflating gas by igniting a composition such as black powder and using the combustion products for an inflating medium. For example, Kobori, U.S. Pat. No. 3,450,414, places a charge of black powder in a cartridge which in turn is disposed within a chamber of a liquid such as dichlorodifluoromethane (Freon 12), liquid propane and solid ethyl alcohol or the like and exploding the powder to vaporize the liquid. Selwa et al., U.S. Pat. No. 3,532,358 shows an inflating device for a crash restraint bag in which there are several pockets filled with black powder which are ignited sequentially to supply the inflating gas. Teague et al., U.S. Pat. No. 3,532,359, discloses a device similar to U.S. Pat. No. 3,532,358, in which several charges of black powder are ignited sequentially, and the combustion gases therefrom pass through a sublimable, vaporizable or decomposable material capable of absorbing heat, such as ammonium carbonate.

Outside of the crash restraint field there are other patents that show various gas generators in various applications. For example, Boyer, U.S. Pat. No. 2,981,616, discloses a gas producing composition comprising various azides, such as sodium azide, lithium azide, etc. and various oxidizing compounds, such as potassium perchlorate, potassium peroxide, etc. to produce a gaseous composition to pressurize liquid fuel in a rocket. Kauffman, U.S. Pat. No. 3,122,462, discloses a similar composition, consisting of an azide (sodium azide or potassium azide), a metal (aluminum, titanium, etc.) and an oxidizer (e.g., potassium premanganate, barium nitrate, etc.), but this composition is used as a pyrotechnic and not for inflation. U.S. Pat. No. 2,980,103 discloses the use of a combustible powder to vaporize a liquid, such as ammonia, to activate a battery, for example. U.S. Pat. No. 3,558,785 shows a gas generator used as a propellant wherein there is a propellant charge of nitrocelluose and nitroglycerin which is ignited to produce a gas mixture which in turn is passed through a bed of charcoal. The water vapor in the gas mixture reacts to form CO and $H_2$. The resulting gas mixture then passes into a chamber containing ammonium carbonate to produce $CO_2$ and $NH_3$. Other patent disclosures in this field are Maxim, U.S. Pat. No. 931,135; Bottas, U.S. Pat. No. 3,421,860; Maurice et al., U.S. Pat. No. 2,779,281; Gender et al, U.S. Pat. No. 3,446,017; Kowalick et al., U.S. Pat. No. 3,305,319; and Halstead et al., U.S. Pat. No. 3,515,518.

However, the state of the art is deficient in a number of areas with regard to providing an effective crash restraint system where the inflating gas is provided at least partly by the products of a chemical reaction. First, for the bag to inflate and offer protection in a crash situation, the inflation must be very rapid, occurring in about 20 milliseconds. On the other hand, even though the inflation must be quite rapid, it must be a controlled inflation rather than an explosive discharge of gases into a bag. Not only would an explosive reaction very possibly cause the bag to impact a person with such force as to cause severe injury, but it also could rip the bag so as to destroy its cushioning effect. Further, if one of the passengers (e.g., a child) happens to be leaning against the dashboard when the bag inflates, an explosive expansion of the bag from the dashboard could throw the child back against the car seat with such violence as to risk injury.

Perhaps the most significant problem area lies in the stringent requirements for a crash restraint inflating system to be acceptable as a "man-rated" system. Since in many crash restraint systems the bag is vented to the interior of the car to prevent a severe rebound action of the bag (i.e., hurling the passenger back against the seat after cushioning the impact), and since there is always a possibility that the bag will rip or puncture in the crash, the inflating gases themselves cannot be such as to cause harm to the automobile occupants. This immediately rules out a large number of gas generating compositions which would produce carbon monoxide as one of the combustion products, or other gas generating compositions that produce more than trace amounts of such toxic products as HCN, HCl, HF, $NO_2$, etc. Also, some of the prior art gas producing systems produce gas combustion products which are themselves too hot and would burn through the bag and/or burn the occupant adjacent the bag in the event the bag ruptures.

Also the prior art attempts to use a sublimable, vaporizable, or decomposing material to cool the combustion gases and to provide additional gas produces problems with respect to a man-rated system. For example, the coolant itself must be non-flammable in view of the possibility of fire in a crash situation (which immediately rules out propane gas, alcohols, etc.) and it also must be non-scalding (which makes it quite problematical to use water as the vaporizing coolant). Toxicity resulting from the combustion gas products interacting with the coolant is another problem. For example, the use of a liquid halocarbon (such as Freon) as the vaporizing fluid, as suggested in the prior art, would likely produce phosgene ($COCl_2$), which is deleterious in amounts as small as two parts per million, and possibly some other toxic products.

There is the further problem of "cardiac arrest." Some chemical compositions, when breathed in by a human being under normal circumstances, are not significantly dangerous. However, in a high stress situation (such as an automobile crash), these same chemical compositions, if inhaled, may cause a person's heart to stop beating for a sufficient time to cause death. Aside from the cardiac arrest, the vehicle occupant is in danger of asphixiation due to insufficient oxygen if several bags are inflated with a gas not containing oxygen. Another problem with the prior art is the explosive noise generated from the inflating apparatus. This could cause injury to the automobile occupants.

The three prior art patents cited above that utilize black powder for a gas producing inflating medium (U.S. Pat. No. 3,450,414; U.S. Pat. No. 3,532,358 and U.S. Pat. No. 3,532,359) involve several of these problem areas. First, the ballistics of black powder are such that the necessary controlled combustion would be difficult, if not impossible as a practical matter, to obtain with any real consistency. Also, certain decomposition products of black powder would be highly unacceptable (e.g. nitric oxide, certain sulfur compounds, and carbon monoxide). Further, the manner of discharging the combustion products of the black powder into Freon would almost certainly produce phosgene in deleterious amounts and other toxic products. Also it is believed that the noise level would be excessive.

The two prior art patents which disclose a composition of sodium azide with other ingredients (U.S. Pat. No. 2,981,616 and U.S. Pat. No. 3,122,462), disclose the concept that such compositions do produce a nitrogen gas among the combustion products. However, these patents do not disclose how these compositions could be made properly applicable to a crash restraint system, nor do they teach how these compositions could or should be applied to a "man-rated" crash restraint system, while alleviating the problem areas indicated above.

Also known in the prior art are various oxygen generating devices. Most of these are applicable to generating breathable oxygen for occupants of an airplane in the event of decompression at high altitudes. Generally these devices involve the burning of a "chlorate candle" which is a composition of a chlorate or perchlorate with a fuel, such as iron powder or carbon powder, which reacts to produce oxygen. Such devices are shown in Moni et al., U.S. Pat. No. 3,276,846; Gustafson, U.S. Pat. No. 3,174,936; Bovard, U.S. Pat. No. 3,536,456; Bovard, U.S. Pat. No. 3,482,568; Mausteller, U.S. Pat. No. 3,542,522; Jackson et al., U.S. Pat. No. 2,554,756; Mausteller, U.S. Pat. No. 3,443,907; McGoff et al., U.S. Pat. No. 3,436,191; McGoff et al., U.S. Pat. No. 3,385,672; Cook et al., U.S. Pat. No. 3,052,526; Bovard et al., U.S. Pat. No. 2,764,475; Bovard et al., U.S. Pat. No. 2,758,015; and Halock, U.S. Pat. No. 2,114,142.

These oxygen producing systems are adapted for producing oxygen over an extended period, such as several minutes, and are not adaptable for use in the present invention.

SUMMARY OF THE INVENTION

The present invention resides in a crash restraint system which has both apparatus and composition features providing the rapid and controlled inflation of a protective confinement (i.e., bag) with the inflating medium being breathable air, and in a method of accomplishing this result. The particular benefit of this invention is that while it accomplishes the primary aim of deploying the crash restraint bag for protection, in the time period after the crash, when the inflating gases may be vented or otherwise discharged into the interior of the autobobile, the passenger, who may be injured and trapped in the car for a period of time, has breathable air in the interior of the car rather than being subjected to breathing an unnatural gaseous mixture.

Characteristic of the invention, a collapsed inflatable bag is so disposed in an automotive vehicle that upon being inflated the bag is positioned between the automobile structure and the location of an occupant so as to provide a protective cushion. The inflating mechanism comprises at least one air generating unit, and preferably a plurality of such units which supply the inflating air in a rapid and controlled manner. Each air generating unit comprises structure which defines a first primary nitrogen generating combustion chamber or zone, a secondary oxygen generating zone, and a tertiary zone which removes the undesired gaseous products while permitting free nitrogen and oxygen to pass therethrough.

The primary nitrogen generating composition comprises a nitrogen producing ingredient, desirably a composition comprising essentially an azide (e.g., sodium azide) and a second ingredient to react therewith, preferably an oxidizer (e.g., potassium perchlorate).

More specifically, the primary composition is made up of an axide, which can be an alkali metal azide, an alkaline earth metal azide or mixtures thereof. Preferably, sodium azide is used. The oxidizer can be a metal perchlorate, a metal chlorate, a chlorocarbon, a metal chloride, or mixtures thereof. It is not desirable, however, to use a carbon containing oxidizer along with an oxygen containing oxidizer, because of the possibility of generating an undesired amount of carbon monoxide as one of the combustion products. The preferred oxidizer is potassium perchlorate.

Upon combustion, this primary composition provides a sustained production of a gas mixture over a very short period (e.g., 20 to 30 milliseconds). The combustion products comprise primarily free nitrogen gas, along with other combustion products (such as sodium oxide and metallic sodium).

Downstream of the primary nitrogen generating combustion chamber or zone is an oxygen producing chamber or zone containing a composition which, upon contact with the hot gas discharged from the primary chamber, produces free oxygen which mixes with the gas mixture from the primary combustion chamber. The oxygen producing composition is characterized in that oxygen is produced over a very short period (e.g., 20 to 40 milliseconds) while being contacted with the hot combustion products from the primary chamber. This composition can be derived from various oxygen containing compositons, such as metal chlorates, perchlorates, bromates, iodates, periodates, manganates, permagnanates, peroxides and superoxides. Metal iodates, periodates, and bromates are less desirable, since these product various amounts of free halogens. Metal peroxides and superoxides are also less desirable, since these produce metal oxides which must be removed if breathable gas is to be obtained. The preferred oxygen producing compositions are those which utilize alkili metal chlorates or perchlorates, (e.g., potassium chlorate, sodium chlorate or potassium perchlorate. In the preferred embodiment, 95 percent by weight potassium perchlorate with 4.0 percent iron powder and 1.0 percent cobalt oxide is used as the oxygen producing composition.

Although in the preferred embodiment the nitrogen producing composition and the oxygen generating compositions are in separate zones, it is feasible to mix pellets of one composition with pellets of the other in the same zone. By use of separate pellets, sufficient segregation of the oxygen producing reaction and the nitrogen producing reaction is achieved at the microscopic level to avoid formulation of highly unacceptable concentration of oxides of nitrogen.

Downstream of the secondary oxygen generating chamber is a tertiary chamber or zone containing a tertiary composition which functions to permit the free nitrogen and oxygen to pass therethrough, while removing from the gas mixture the other gas products (such as sodium oxide and metallic sodium). In the preferred embodiment this is accomplished by a combination of functions, namely reacting out these other combustion products, condensing them out and also mechanically filtering them out. This tertiary composition also functions to cool the nitrogen-oxygen mixture to a temperature where it would not be harmful to the occupants of the automobile. Desirably the tertiary composition comprises an acidic oxide (e.g., copper oxide, boric oxide, silicon oxide, or aluminum oxide) and in some instances a constituent such as activated charcoal to react with free sodium. Also, mechanical filtering and cooling compositions (e.g., fibre pad felts, steel wool, sintered metal, cloth, plastic felt, etc.) can be effectively utilized in this tertiary chamber.

DESCRIPTION OF THE PREFERRED EMBODIMENT

A clearer understanding of the present invention will be attained by first describing the total system and its operation, and then describing in more detail the individual components of this system.

A. TOTAL SYSTEM

Figure 1:
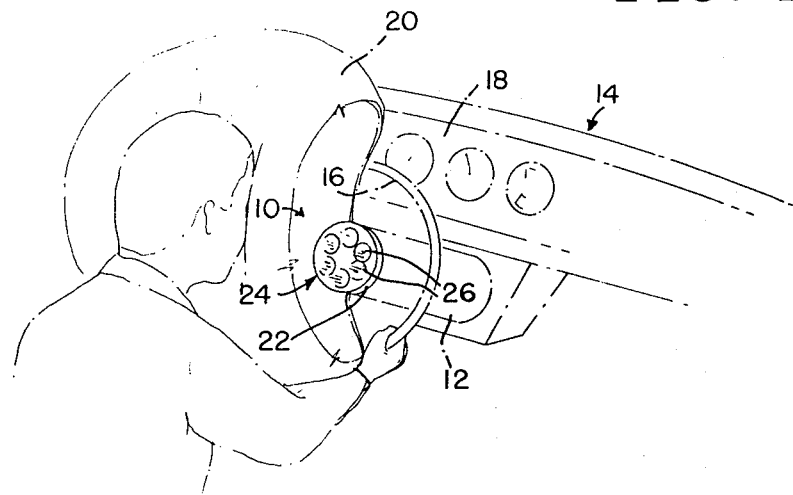
FIG. 1 is an isometric view of the system of the present invention with the bag in its inflated position.

With reference to FIG. 1, the crash restraint apparatus 10 of the present invention is shown mounted on a steering column 12 of an tutomobile 14 having a steering wheel 16 and dashboard 18. The apparatus 10 comprises an inflatable bag 20 which in FIG. 1 is shown in its inflated position, wherein the bag is suitably folded, as in a pleated condition (i.e., accordion fashion). The bag 10 is attached to a circular mounting structure 22 within which is housed an air generating assembly 24 which communicates with the interior of the bag 20.

The air generating assembly 24 is made up of at least one and desirably a plurality or cluster of individual air generating units 26. As shown herein, there are six such units 26 clustered in a hexagonal array at the head of the steering column 12. These units 26 are arranged to discharge their inflating air in a rearward direction into the bag 20 to cause the bag 20 to expand in a rearward direction from the head of the steering column 12, as illustrated in FIG. 2, to provide a protective cushion.

Figure 2:
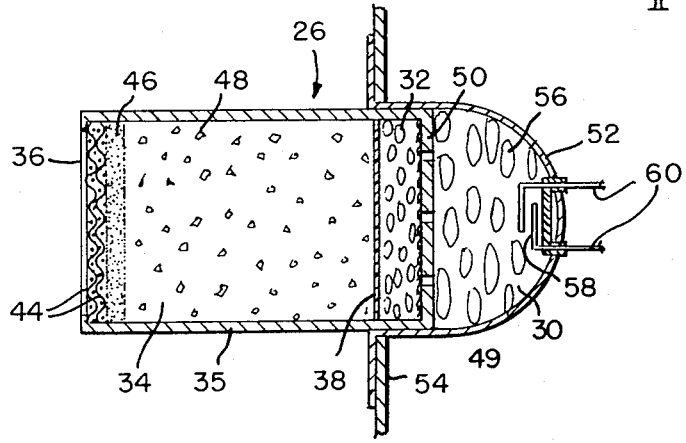
FIG. 2 is a longitudinal sectional view of one of the gas generating units of the present invention.

An individual air generating unit 26 is shown in FIG. 2 and comprises a primary nitrogen producing combustion chamber or zone 30, a secondary oxygen producing chamber or zone 32, and a tertiary chamber or zone 34. As shown herein, the housing portion for the tertiary zone 34 comprises a cylindrical sidewall 35, a flat circular sealing diaphragm 36 at its downstream or discharge end, and a suitable separator, such as a plastic membrane 38, at its opposite end. The sealing diaphragm 36 is mounted to the sidewall 35 by bonding or other means.

At the extreme downstream end of the tertiary chamber are one or more retaining screens 44, adjacent the sealing diaphragm 36. Upstream of the screen 44 is a final stage mechanical filter 46, which can be a layer of fibre felt pad. Upstream and adjacent to the filter 46 is the tertiary composition 48 which (except for flow pores, which are 40 percent of the volume) occupies most of the volume of the tertiary zone 34. At the upstream end of the tertiary composition 48, is the aforementioned plastic membrane 38.

The secondary oxygen generating zone 32 is defined by the aforementioned sidewall 35, its downstream boundary being its interface with the tertiary zone 48 (which is the present embodiment of the membrane 38) and its downstream boundary being a perforate plate 50, which for convenience is made integral with the sidewall 35. The oxygen producing composition is designated 49.

The primary nitrogen generating chamber 30 is defined by a hemispherical plate 52 and the perforate plate 50. For ease of manufacture, this hemispherical plate 52 is made integral with a mounting plate 54 by which the several units 26 are interconnected in a cluster and attached to the mounting structure 22 of the steering column 12.

In the primary combustion chamber 30 there is positioned a charge of a primary nitrogen generating composition (described in more detail hereinafter) in the form of pellets 56. At the lower end of the primary combustion charge 56 is an igniter 58 having a pair of leads 60 which in turn are attached to a suitable voltage source for causing ignition of the composition 56. The firing of the igniter 58 is caused by a suitable crash sensor, such as one of the inertial switches known in the prior art.

To describe the operation of this system, in a crash situation an activating switch sends electric energy to each of the ingiters 58 in the several units 26. The igniter 58 causes its pellets 56 to burn (causing rupture of the membrane 38 and diaphragm 36) so as to provide a sustained and controlled production of combustion gases for a short duration (e.g., 20 to 30 milliseconds). As will be disclosed hereinafter, the gases produced by the primary composition pellets 56 comprise free nitrogen and other combustion products. These gases pass through the perforate plate 44 and into the secondary oxygen producing chamber 32. This causes the oxygen producing composition 49 to release free oxygen which mixes with the combustion gases from the primary chamber 30. The perforations in the plate 50 have an area selected to control the pressure in the primary chamber 30 and thus maintain the burn rate at a desired value. These perforations can be closed by a rupturable membrane.

The gas mixture (nitrogen, oxygen and other gas products) passes from the oxygen generating zone 32 into the tertiary zone 34 to cause an increase in pressure to burst the diaphragm. As the gas mixture passes into the tertiary zone 34, the nitrogen and oxygen components of the gas mixture pass through the tertiary zone 34 and come out as inflating breathable air, while the other components of the gas mixture are reacted, condensed and filtered out of the gas mixture. The resulting breathable air mixture continues to flow into the bag 20 at a controlled rate to cause the bag 20 to inflate into its deployed position to act as a crash restraint cushion.

In an alternate configuration pellets of the oxygen producing composition 49 are placed among the nitrogen producing composition pellets 56 in a single chamber or zone 30. In such an arrangement the pellets 56 represent a plurality of primary sub-zones interspersed with secondary sub-zones occupied by the oxygen producing pellets 49. Thus, the nitrogen from the primary sub-zones passes through the secondary sub-zones to generate free oxygen, and the nitrogen and oxygen mixture then passes through the plate 50 into the tertiary chamber 30.

B. PRIMARY NITROGEN GENERATING COMPOSITION

In general, the primary nitrogen-generating composition 56 of the present invention comprises a nitrogen producing ingredient and a second ingredient reactant therewith upon excitation, which second ingredient is desirably an oxidizing ingredient. The nitrogen producing ingredient disclosed herein is an azide, an alkaline earth metal azide, which can be an alkali metal azide or mixtures thereof. The preferred azide is sodium azide.

The oxidizer to be combined with the azide can be a metal perchlorate (e.g., potassium perchlorate), a metal chlorate (e.g., potassium chlorate), a chlorocarbon (e.g., $C_6Cl_6$), a metal chloride (e.g., calcium chloride or magnesium chloride), and certain metal peroxides and superoxides (e.g., potassium peroxide, $K_2O_2$; potassium superoxide, $KO_2$; sodium peroxide, $Na_2O_2$, etc., or mixtures thereof). However, it is desirable not to combine oxidizers having both carbon and oxygen, because of the possibility of producing carbon monoxide. The preferred oxidizer is potassium perchlorate, although $C_6Cl_6$, calcium chloride and potassium chlorate have also been used satisfactorily as oxidizers in the present system. Also, small amounts of powdered metal, such as powdered aluminum, can be added to react with a small part of the nitrogen and add heat to the reaction, but in general the reaction of the metal with the nitrogen in the absence of an oxidizer is too slow to be effective in the present crash restraint system.

The characteristics of the present primary nitrogen generating composition, are next described with reference to sodium azide as the nitrogen producing ingredient, and potassium perchlorate as the oxidizer, it being understood that the following description is not limited to those specific ingredients. The stoichiometric reaction of sodium azide and potassium perchlorate is as follows:

$KClO_4 + 8NaN_3 \rightarrow KCl + 4Na_2O + 12N_2$

The stoichiometric balance of these two ingredients occurs by use of 21.03 percent potassium perchlorate and 78.97 percent sodium azide, by weight. When the proportion is oxidizer rich (i.e., excess potassium perchlorate), a certain amount of free oxygen is also generated as one of the combustion products. On the other hand, when the composition is sodium azide rich, a certain amount of metallic sodium in vapor or liquid form is produced, with additional free nitrogen. It is somewhat less desirable to generate free oxygen in the primary combustion chamber, since there is a greater possibility for the oxygen to react with the nitrogen in the primary combustion chamber to form nitrogen oxides which can be harmful to humans when inhaled. However, compositions containing as much and even more potassium perchlorate by weight than sodium azide have been fired, with only small amounts of oxides of nitrogen being formed.

In general, though, making the composition sodium azide rich beyond the point of stoichiometry is advantageous, since less heat is generated, and more nitrogen gas is released. Further, there is less sodium oxide generated (which is an undesirable combustion product) and less potassium chloride generated. There is more free sodium (rather than sodium oxide), but the free sodium is easier to subsequently react out than the sodium oxide.

It has been thus determined that, according to the present invention, the composition range of the ratio of potassium perchlorate to sodium azide should be between about 1 to 20 and 2 to 1, by weight. When the percentage of sodium azide is greater than the approximate 1 to 20 range, there is difficulty in producing enough heat to drive the reaction to inflate the bag quickly enough. At the other extreme, with too much oxidizer, there is the possibility of forming nitric oxide. The preferred range of these constituents is between about 1:10 and 1:1, by weight. 90 percent sodium azide and 10 percent potassium perchlorate has been found to provide a very staisfactory primary gas producing composition.

In some instances it is desirable to add a sustaining heat source in the primary composition to provide a steady burning. Such a heat source is characterized by not generating any large amount of gaseous combustion products, and burning at a substantially uniform rate rgardless of pressure variations in the combustion chamber. A suitable such heat sustainer is pellets made of 18 percent boron and 82 percent potassium nitrate.

C. SECONDARY OXYGEN GENERATING COMPOSITION

The function of the secondary chamber and the composition therein is to permit the gas mixture from the primary chamber to pass therethrough and to add to this mixture free oxygen. Thus, the oxygen generating composition will be a porous composition.

The oxygen producing composition is characterized in that oxygen is produced over a very short period (e.g., 20 to 40 milliseconds) while being contacted with the hot combustion products from the primary chamber. This is desirable for two reasons. The gas generator must produce the proper quantity of gas to inflate the bag within the desired time (e.g., 20 to 40 milliseconds). If the oxygen is produced over a longer time period, the bag would not be inflated in time to protect the passenger even though the final gas mixture might have a breathable composition. Also if the oxygen is produced much more slowly then the nitrogen, the gas stream issuing from the generator near the end of the inflation period would be oxygen rich and might cause vigorous combustion of certain materials (i.e., the bag or structure components).

The oxygen generating composition can be derived from various oxygen containing materials, such as metal chlorates, perchlorates, bromates, iodates, periodates, manganates, permanganates, peroxides and superoxides. A primary requirement is, of course, that the composition must liberate oxygen when heated by and/or reacted with combustion products from the primary chamber. Further requirements are that the oxygen generating composition must be stable under a wide range of environmental storage conditions and should not produce toxic or obnoxious materials when decomposed. Certain of the oxygen producing materials mentioned above are less desirable because upon heating (i.e., by the hot gas from the nitrogen generating zone) certain toxic products are formed which must be removed from applications in man-rated devices. For example, metal iodates, periodates and bromates, when heated, produce various amounts of free halogen (i.e., bromine or iodine) which are known to be harmful to humans. Also metal peroxides and superoxides result in formation of metal oxides which must be removed from the gas if a breathable gas is to be obtained.

The preferred oxygen producing compositions are those which utilize alkali metal chlorates or perchlorates (e.g., potassium chlorate, sodium chlorate or potassium perchlorate). These materials when heated by hot gas from the nitrogen producing composition result in products which are relatively non-toxic to humans as illustrated by the following equations:

$$2NaClO_3 \rightarrow 2NaCl + 3O_2$$

$$KClO_4 \rightarrow KCl + 2O_2$$

In actual practice very small quantities of free chlorine are also formed under certain operating conditions but in general the conditions may be adjusted such that the quantities produced are not harmful to humans.

In addition to an oxygen containing chemical, the oxygen producing composition may contain a fuel such as iron or cobalt powder and a catalyst which can consist of cobalt oxide, cobalt chloride, copper chromite or one or a combination of other catalysts which are well known in the art.

In the preferred embodiment a mixture of 95percent by weight of potassium chlorate, 4.0 percent iron powder and 1.0 percent cobalt oxide is used as the oxygen producing composition.

The composition is shaped into thin wafers to provide a high surface to volume ratio and yet has sufficient strength to withstand vigorous handling, vibration and storage environments. Also this composition does not sustain combustion at normal conditions of temperature and pressure, but when heated by the combustion gases at higher temperatures, it produces oxygen at a sufficiently rapid rate.

Desirably the amount of secondary oxygen producing composition is such relative to the primary composition that the amount of oxygen produced is one quarter of the free nitrogen produced, so that the resulting inflating gas mixture is 80 percent nitrogen and 20 percent oxygen, which is breathable air. Excessive oxygen contents (e.g., 60 percent) would be a fire hazard, while insufficient oxygen (e.g., 2 percent) does not avoid cardiac arrest or asphixiation hazards.

The resulting gas mixture from the secondary chamber is thus a mixture of free nitrogen, free oxygen, and other combustion products, which in the preferred embodiment would be sodium oxide, potassium chloride, and in some instances trace amounts of free sodium.

D. TERTIARY CHAMBER COMPOSITION

The function of the teritiary chamber composition is to permit the nitrogen gas and oxygen gas to pass therethrough and into the bag 20, while removing the undesirable constituents of the gas mixture, and also cooling the nitrogen-oxygen gas mixture passing into the bag 20. It is theorized in the preferred embodiment herein that the tertiary composition simultaneously performs four functions: (a) mechanical filtering, (b) condensing out the undesirable gas components, (c) chemically reacting out the undesired combustion products, and (d) acting as a heat sink to cool the hot gas to an acceptably cool temperature for bag inflation.

If enough space were available in the tertiary zone, separate zones might be provided to accomplish the aforementioned four functions of the tertiary composition at least partially in series. In practical cases, however, the volume available is usually very limited and it is desirable to combine all of the functions in order to minimize the volume required.

In order to perform its functions properly, the tertiary chamber composition must have several characteristics. The material should have a high thermal conductivity, a high density and a high specific heat in order to provide efficient cooling. The material should also possess a high strength to resist crushing forces produced by high velocity gas flow through the filter flash coolant pores. It is also desirable that the material have a high surface-to-volume ratio (consistent with avoiding excessive pressure drop forces) in order to promote efficient cooling, chemical reaction and filtering action.

Proper functioning of the invention is dependent on providing a properly chosen flow resistance (choking effect) downstream of the nitrogen producing composition. This must be accomplished in such a way that the gas flow is evenly distributed over the cross-sectional area of the tertiary composition. It will be obvious to those skilled in the art that the flow resistance and primary composition surface burning area must be selected to provide the desired gas generation rate and duration. In the preferred embodiment, the primary composition burn rate is controlled by a distributed pattern of orifices provided downstream of the nitrogen producing zone by the plate 50, but upstream of the oxygen producing zone. Optionally the controlling flow resistance may be provided by the tertiary composition bed itself and/or by a pattern of orifices in a perforate closure plate located downstream of the tertiary composition bed. These options have been shown feasible but tend to result in extended ignition delay of the primary composition and less controllable gas downstream rate versus time relationships.

With respect to the aforementioned function of reacting out the undesirable gas components, the combustion products from th primary chamber to be reacted out in the tertiary zone are a metal oxide derived from the azide and possibly some free metal from the azide when the primary nitrogen generating composition is azide rich. Generally all the free metal will form oxide in the oxygen generating zone and not reach the tertiary zone. The function of the tertiary composition will be described with reference to the preferred primary nitrogen generating composition (i.e., sodium azide and potassium perchlorate), although it is not intended that it be limited thereto.

As above indicated, if there is a stoichiometric balance between the sodium azide and potassium perchlorate, the main combustion products from the primary chamber are nitrogen, sodium oxide and potassium chloride. Sodium oxide is harmful to human beings when inhaled, and therefore should not be present except in trace quantity in the crash restraint bag. If the nitrogen generating composition is azide rich, there will also be free sodium generated as one of the combustion products, and this of course should not be present in the crash restraint bag, since free sodium can be harmful if inhaled by humans.

Thus, regardless of the proportioning of the potassium perchlorate and sodium azide, the composition for the tertiary chamber desirably contains an ingredient or ingredients to react with the metal oxide (i.e., $Na_2O$). It has been found that an acidic oxide, such as silicon oxide, boric oxide, cupric oxide, or aluminum oxide are suitable for this purpose.

When silicon oxide is used, it is in the form of silica gel, sand or crushed glass. Sodium oxide reacts with the silicon dioxide in the following manner.

$$Na_2O + SiO_2 \; Na_2SiO_3 \text{ (sodium metasilicate)}$$

This equation is a much simplified version of the actual chemical reactions taking place, since silica gel is not simply $SiO_2$, but also contains hydroxyl groups, water and other impurities. Sodium oxide and silica can also combine in other ratios forming other less well-defined silicates.

Since sodium metasilicate ($Na_2SiO_3$) has a lower melting point (1362° K.) than silicon dioxide the formation of $Na_2SiO_3$ can result in a molten layer on the silica gel surface. The glazed appearance of the silica gel observed in some experiments wherein silica was used as the main component of the secondary reaction composition is believed due to molten $Na_2SiO_3$. It is believed that this molten surface may aid in removing non-reactive particles by trapping them in the sticky surface layers.

It is also believed that the sodium (if any) which passes the oxygen production zone condenses on the colder areas of the silica gel and that a significant fraction of this is then removed by reaction with the silica gel. This reaction is considered to consist primarily of the reaction between sodium and the hydroxyl groups and water attached to the very porous surface of the silica gel as shown in the following equations:

$$2Na + H_2O \rightarrow Na_2O + H_2$$

$$Na + (-Si-OH) \rightarrow -Si-O-Na + \tfrac{1}{2}H_2$$

Proof that these reactions take place has been demonstrated by the presence of trace amounts of hydrogen in the exhaust products. Sodium oxide producte in the reaction would be solid or partially liquid, depending on the combustion chamber temperature of the primary composition. It is theorized that the sodium oxide created above its melting point reacts rapidly with the silica gel according to the equation above showing this reaction forming sodium metasilicate.

With respect to using cupric oxide in the secondary reaction composition, cupric oxide (CuO) reacts with sodium oxide in the following manner.

$$Na_2O + CuO \longrightarrow Na_2CuO_2$$

In the experiments performed copper oxide was used in a wire form but could be used in other forms, such as deposited on a carrier substrate.

When alumina $Al_2O_3$) is used as an ingredient in the tertiary reaction composition, it is desirably in the form of a porous bed of fused or sintered alumina wherein void volume provides microscopic flow passages while the solid portion of the bed is dense and non-porous at the microscopic scale so as to provide high values of heat capacity, thermal conductivity and resistance to crushing. Alumina is believed to be quite effective as a cooling and condensing agent for sodium oxide.

An effective approach for providing a structurally intact bed (while retaining good chemical, filtration, and cooling characteristics) is to coat aluminum oxide granules with melted $B_2O_3$ (using about 5–25 percent by weight $B_2O_3$), press the hot, coated $Al_2O_3$ granules into the desired bed shape (into the bed chamber or into a metal shell which can be inserted into the bed chamber), and cool to solidify the $B_2O_3$ which then acts to bind the $Al_2O$ into a rugged integral bed.

Along with the chemical reactions to remove the undesirable gas components, the tertiary composition acts as a heat sink to cool the gaseous mixture from the secondary chamber. This not only brings the emitted nitrogen-oxygen mixture down to a temperature so that it will not be harmful to humans, but it also causes a condensation of the undesirable products (e.g., free sodium, sodium oxide and potassium chloride) on the tertiary composition. In addition, the porous tertiary composition acts as a mechanical filter to remove the dust-like particles of sodium, sodium oxide, etc. In addition to the tertiary composition mentioned above, a mechanical filtering material can be also added desirably to the downstream cross-section of the tertiary chamber, for example fibre felt pad, steel wool, sintered metal, cloth or paper felt. In the preferred embodiment fibre felt pad filter (e.g., polyester plastic) is used as a mechanical filter at the downstream end of the tertiary chamber. Also, it has been found the efficiency of the tertiary composition bed and the mechanical filter pad results from depositing a thin layer of an adhesive or tacky material on the surface of the fused alumina or the fibres of the mechanical filter.

As a modification, the secondary oxygen generating chamber can be made sufficiently large and more of the oxygen generating composition added to the secondary chamber so that the further downstream portion of the secondary oxygen generating chamber serves the function of the tetriary composition to filter out and condense out undesired combustion products and cool the nitrogen and oxygen gas mixture.

EXAMPLE 1

The preparation of chemical compositions for use in this experiment is described as follows:

To prepare the nitrogen generating composition a mixture of potassium perchlorate and sodium azide was made in the following manner. Potassium perchlorate, Grade A, Class 3, Specification MIL P 217A, 99.8 percent purity, with a particle size of about 6 microns was used in order to obtain the desired burning rate. This particle size was obtained by processing the potassium perchlorate in a Mikro-Pulverizer, using one pass at 14,000 rpm. The pulverized potassium perchlorate was kept dry; and just prior to use it was dried at 110°C. for 2 hours. Sodium azide, 99 percent minimum purity, 0.05 to 0.4 mm mesh size was used after sieving through a Tyler No. 35 screen to remove lumps.

The pulverized potassium perchlorate and sodium azide were blended in a Patterson-Kelley Twin Shell Blender 5 minutes to obtain a uniform dry granular material which could be pressed into pellets. The mixture was 90 percent sodium azide by weight and 10 percent potassium perchlorate.

The pellets were pressed in a 0.47 inch diameter cylindrical die using a Stokes Model F single punch tablet press. In this experiment the weight of each single pellet was approximately 0.4 gram; its diameter was 0.47 inch; its thickness was 0.09 inch.

To prepare an ignition sustainer powder, potassium perchlorate powder and sodium azide powder were prepared and blended to form a mixture of 79 percent by weight sodium azide and 21 percent by weight potassium perchlorate.

The oxygen producing composition contained 95 percent by weight potassium chlorate, 4 percent by weight iron powder, and 1 percent by weight cobalt oxide. This composition was prepared by manually dry blending potassium chlorate (Hooker Chemical Corporation, powdered form, 99.7 percent minimum $KClO_3$) and cobalt oxide formed by roasting cobalt carbonate (Baker AR powder, assay 45–50 percent Co) in a 240°F. oven for 72 hours. The potassium chlorate/cobalt oxide blend was then passed through a Mikro-Pulverizer for one pass at 14,000 rpm. Iron powder (Baker AR powder, assay 96 percent Fe) was blended into the Mikro-Pulverized mixture of potassium chlorate and cobalt oxide using a Patterson-Kelley Twin Shell blender. Pellets were pressed from the resulting powder using a 0.47 inch diameter cylindrical die and a Stokes Model F single punch tablet press. Each pellet was approximately 0.3 grams; its diameter was 0.47 inch; and its thickness was 0.05 inch.

The tertiary bed material was prepared by coating 24–32 mesh sidewalk grain aluminum oxide "Alo," about 95 percent by weight $Al_2O_3$ (manufactured by the Carborundum Corporation) with $B_2O_3$ for the inlet portion of the bed and with silicone adhesive for the outlet portion of the bed. The $B_2O_3$ coated $Al_2O_3$ was prepared by mixing finely divided $B_2O_3$ powder (U.S. Borax Corp., HP Boric Acid, Anhydrous 60M Technical) with the 24–32 mesh "Alo" and heating in a stainless steel beaker to a temperature which causes the $B_2O_3$ to melt. The melted material was mixed and allowed to soak at temperature for ten minutes and then poured onto a metal plate to form a fluffy mass. This mass was allowed to cool to room temperature and then gently agitated to separate th coating particles from one another. The silicone adhesive coated $Al_2O_3$ was prepared by soaking the "Alo" in 20 percent Dow Corning 282 Silicone, draining the excess silicone, and then oven drying the resulting mass to remove residual solvent.

Gas generator buildup was accomplished as follows using the above described compositions.

The experiment employed a gas generator housing of carbon steel having an overall diameter of 1.6 inches and an overall length of about 3 inches. A weight of 0.6 gram of the igniter powder composition was packaged in intimate contact with an electric match (Part No. ECB-400) manufactured by Atlas Chemical Industries, using aluminum foil for packaging purposes. This package was placed in the bottom portion of the gas generator housing with igniting lead wires passing through the bottom of the housing and sealed at the lead wire ports with epoxy potting compound. Twenty-six pellets (0.47 inch diameter by 0.09 inch thick) of the nitrogen producing pellets mentioned above were placed in the bottom of the housing so as to surround the ignitor powder/match subassembly. A 12×12 mesh wire screen was placed on top of these pellets, a ½ inch long cylindrical insert completely open on one end but closed (except for a 19 hole orifice pattern) on the end nearest the nitrogen producing pellets was then bonded to the gas generator inside surface. (The outside diameter of this insert was just slightly smaller than the inside diameter of the housing.) Prior to assembly, the orifices were sealed on the upstream side by two layers of 3M Scotch Polyester pressure sensitive film tape No. 852. Twenty-seven pellets of the oxygen producing composition (0.47 inch diameter by 0.09 inch thick) were placed in the open end of the cylindrical insert.

A second cylindrical insert was prepared for assembly as follows: The insert was approximately 2.2 inches long and of the same diameter as the first insert. One end (to be inserted adjacent to the oxygen producing composition) was completely open, while the other end had a circular opening of diameter about ¼ inch smaller than the inside diameter of the insert (thus providing a flange for supporting an end closure). The end closure was made by inserting a 20 × 20 mesh screen followed by a 80 × 80 mesh screen followed by a polyester felt pad filter (Western Filter Company designation FIL-3-2) all having diameters just slightly smaller than the inside diameter of the insert. This closure/filter combination was bonded to the insert flange (around the periphery) by means of epoxy cement. Approximately 18 grams of the silicone coated 24–32 mesh aluminum oxide described above was then placed into the insert and pressed against the filter pad. This was followed by approximately 50 grams of the 24–32 mesh aluminum oxide coated with 7 percent $B_2O_3$ as described above. This was followed by pressing 18 grams of 24–32 mesh aluminum oxide coated with $B_2O_3$ and heated above the melting point of $B_2O_3$. This hot mass was pressed into the open end of the insert to completely fill the insert and then allowed to cool to form a rigid but porous mass. The second cylindrical insert was then bonded by means of epoxy adhesive into the gas generator housing such that the end containing the fused $B_2O_3$ coated $Al_2O_3$ plug was adjacent to the oxygen producing propellant and the screen/filter closure projected out the originally open end of the gas generator housing. The overall length of the resulting gas generator assembly was 3.7 inches.

This gas generator assembly was then placed inside a larger tank which was purged with helium and then closed to be lead-tight. The gas generator assembly was fired and pressure and temperature transient data was recorded. The duration from delivery of current to the ignition assembly to completion of gas generation was measured to be about 35 milliseconds. From pressure and temperature data, the delivered gas temperature (averaged for the 35 milliseconds) was estimated to be 210°F., an acceptable temperature for bag inflation. A gas sample was withdrawn from the tank and subjected to gas chromatograph analysis. After correction for helium dilution, the composition of gas delivered by the gas generator was determined to be 76.4 percent $N_2$, 22.3 percent $O_2$, 1.2 percent $H_2O$, and 0.1 percent CO plus a trace of $CO_2$. This is clearly a nontoxic and breathable composition as desired for bag inflation. The tank was then opened and all solid residue was removed by rinsing with distilled water. The insoluble residue was separated by filtration and determined by a gravimetric analysis technique to total 30 mg. The sodium content in the soluble portion was determined by a flame spectroscopy technique to contain only 0.8 mg. Na (probably combined as $Na_2O$). These results are indicative of extremely good filter performance and are believed most acceptable from the toxicity standpoint.

Six additional gas generators were fabricated exactly as described above and then mounted to a fixture to form a cluster arranged in a circle. A 1.6 ft.³ polyurethane coated nylon bag (7 ¼ oz./yard) was attached to the fixture and folded in a deflated fashion so that it could be filled by gas emanating from the gas generator cluster. The test instrumentation was as follows:

| Variable | Equipment |
|---|---|
| Noise Level | Bruel & Kjoer Measuring Amplifier Model 2606 |
| | B&K ¼" Microphone Model 4136 |
| Bag Pressure | 0–20 psig on high speed viscorder |
| Bag Surface Temperature | Chromel vs. Alumel thermocouple on high speed viscorder |
| Gas Temperature | Do. |
| Hardware Soak Temperature | Do. |
| Mount Structure Thrust Transients | 0–5000-lb. load cell on high speed viscorder |
| High Speed Photography | Hycam High Speed Cameras |

The test results were as follows:
1. Overall

Favorable observations included extremely low noise level, lack of any visible dust, very low bag temperature rise, and low deployment and bag yank forces on the mount structure.

2. Test Data
   a. Inflation Results

Important numerical test results are tabulated below:

NUMERICAL DATA

TEST AGS-1 CONDUCTED JUNE 3, 1971

| Item | Value |
|---|---|
| Peak Noise Level | 140 db |
| Inflation Time (signal to 1 psig) | 35 msecs |
| Delivered Gas Temperature (peak) | 223°F. |
| Bag Peak Soak Temperature Rise | |
|   Outside Surface | 14°F |
|   Inside Surface | 16°F |
| Mount Thurst (peak) | |
|   Deployment Force | 220 lbf |
|   Bag Yank | 380 lbf | b. Chemical Analysis

The gas analysis of a sample drawn from the inflated bag into an evacuated bottle at 100 msec from inflation signal is as follows:

| Constituent | Vol. % |
|---|---|
| $N_2$ | 71.5 |
| $O_2$ | 24.9 |
| $H_2O$* | 2.4 |
| $CO_2$ | 1.0 |
| CO ** | 0.2 |
| | 100.0 |

* Water is not a combustion product; its presence is accounted for by adsorbed moisture on filter materials and bag.
** Carbon monoxide presence is due to use of epoxy bonding techniques.

EXAMPLE 2

In this experiment, a gas generator module was built up by bolting together sections of 4.5 inches outside diameter cylindrical aluminum hardware. The bottom segment contained a hemispherical cavity (diameter 1.5 inches) for containment of an ignitor package like that of Example 1. The ignitor package was mounted near the bottom of the cavity in a fashion similar to that employed in Example 1. 27 pellets of the nitrogen producing composition were placed in the cavity surrounding the ignitor package. A 12 × 12 mesh screen was placed on top of the pellets. A perforated plate (outside diameter 4.5 inches) with 19 orifices distributed within a 1.5 inch diameter area was placed on top of the bottom segment with the orifice pattern centered over the cavity in the bottom segment. Then a cylindrical container was built up by placing 4.5 inches outside diameter and 1.5 inches inside diameter cylindrical segments on top of the orifice plate to give an additional height of 2.9 inches for secondary and tertiary compositions. A 1.5 inch diameter circular glass cloth layer was placed inside this built-up cylinder and directly over the orifice plate.

In this experiment of the oxygen producing composition was prepared by grinding Baker AR crystal potassium chlorate (assay 99.5–100.5 percent $KClO_3$) manually using a mortar and pestle until all of the potassium chlorate passed through a Tyler No. 80 sieve. The ground potassium chlorate was then pressed in a Stokes Model F single punch tablet press using a 0.47 inch diameter die. Each pellet was approximately 0.3 gram in weight, 0.47 inch in diameter and 0.048 inch thick.

Sufficient pellets of this oxygen producing composition to give a total weight of 15 grams were placed on top of the glass cloth.

The tertiary composition for this experiment consisted of uncoated 24–32 mesh "Alo" $Al_2O_3$ described in Example 1. Approximately 100 grams of this material was placed on top of the oxygen producing composition.

On top of the tertiary composition was placed an 80 × 80 mesh screen followed by an 8 × 8 mesh screen and then a 4 × 4 mesh screen. A final aluminum segment was then placed on top of the screens. (Proper O-ring seals were provided where needed to assure that all generated gas passed outward through the screens in a direction perpendicular to the plane of the screens.) The entire assembly was then bolted together to form an integral unit.

The assembly was fired in a larger tank using a procedure identical to that described in Example 1, except that in this case, pressure taps were available to measure internal gas generator pressure transients.

The duration of gas generation was about 25 msec. Gas analysis results showed 75 percent $N_2$ and about 25 percent $O_2$ with less than 0.1 percent CO and only a trace of $CH_4$. Small amount of $CO_2$ and $H_2O$ may have been present but were not measured quantitatively because it was known that it was chemically impossible for the compositions used in this experiment to produce excessive quantities of $CO_2$ or $H_2O$ for the proposed application. The average generated gas temperature was determined to be 165°F. by means of the technique employed in Example 1. The dust measurement techniques of Example 1 showed a total insoluble dust of only 45 mg. in the generated gas along with 22 mg.

of sodium in the form of a water soluble compound (presumed to be $Na_2O$).

EXAMPLE 3

The same procedure was followed as in Example 2 except that:
1. The orifice plate was moved from a location just downstream of the nitrogen producing composition to a location just downstream of the exit screen closure.
2. No screen and no glass cloth were employed in the vicinity of the gas generating chemicals.
3. The oxygen producing composition of Example 1 was used in place of that described in Example 2 and it was placed in a layer having direct contact with the $N_2$ generating composition.
4. A ⅜ inch thick segment of the tertiary composition was prepared from the 7 percent $B_2O_3$ coated "Alo" $Al_2O_3$ described in Example 1. This segment was fused to form a structurally rigid plug.

Results included: a gas generation duration of about 35 msec; a gas composition of 78.0 percent $N_2$, 21.7 percent $O_2$ and 0.3 percent $H_2$; insoluble dust totalling 42 mg; soluble sodium compounds in the dust totalling 6 mg; and an average delivered gas temperature of 135°F.

EXAMPLE 4

The same procedure was followed as in Example 2 except that:
1. No screen was placed above the nitrogen producing composition.
2. A standard Atlas match (ECB-300) (rather than the Atlas Part No. ECB-400 match) was employed.
3. A seven hold orifice plate was empolyed in place of a nineteen hole orifice place.
4. The oxygen producing composition consisted of a one inch layer (42 gms) of 24–40 mesh granular of 24–40 mesh granular $KMnO_4$.
5. The tertiary composition consisted of a 1.5 inch layer of uncoated "Alo" $Al_2O_3$ granules sieved to be in the 12–16 mesh size range.

Results included a gas generation duration of about 20 msec; a delivered gas composition of 68.3 percent $N_2$, 31.4 percent $O_2$, and 0.3 percent $H_2O$ with no detectable CO, $CO_2$ or $NO_2$; insoluble dust negligible within the accuracy of the measurement; soluble sodium compounds in the dust totalled 2.0 mg; and a delivered gas temperature of 172°F.

EXAMPLE 5

The same procedure was followed as in Example 2 except that:
1. Only 0.3 gram (rather than 0.6 gram) of the ignitor powder was used.
2. Only 12 pellets of the nitrogen composition were employed.
3. Teh orifice plate contained seven orifices rather than nineteen orifices.
4. An 8 × 8 mesh and a 100 × 100 mesh screen was placed above the orifice plate.
5. A 3 gram layer of 12–20 mesh silica gel followed by a 50 gram layer of $KClO_4$ (240 mesh) served as both the oxygen producing composition and the tertiary composition. (The $KClO_4$, in particular, is capable of achieving both functions.)
6. No dust analyses or gas generator pressure measurements were provided.

Results included a delivered gas composition of 87 percent $N_2$, 11 percent $O_2$ and 2 percent $H_2O$ and an average delivered gas temperature of 360°F.

EXAMPLE 6

The same procedure was followed as in Example 2 except that:
1. The nitrogen generating pellets and the oxygen generating pellets were mixed together and placed in the same (bottom) chamber.
2. Sufficient pellets of the oxygen generating composition to give a total weight of 10 grams (rather than 15 grams) were used.
3. The orifice plate placed above the oxygen and nitrogen generating compositions contained 7 holes with a total orifice area equivalent to the 19 hole plate employed in Example 2.
4. The tertiary composition consisted of approximately 100 grams of 7 percent $B_2O_3$ coated "Alo" described in Example 1. This composition was placed directly over the orifice plate.
5. A FIL 3-2 filter (described in Example 1) was placed at the outlet and of the tertiary composition, just upstream of the multiple screen closure.

Results included a gas generation duration of about 25 milliseconds; a delivered gas composition containing about 78.5 percent $N_2$, 20.8 percent $O_2$, 0.1 percent CO, 0.2 percent $CO_2$, 0.4 percent $H_2O$ and 480 parts per million $NO_2$; and very little dust was observed by inspection of the inside of the tank and the pressure trace indicated an acceptably low delivered gas temperature.

Although the $NO_2$ content of the gas was considerably more than for previous Examples, it is in the range which may be acceptable, depending upon what further study on human requirements proves to be an acceptable concentration of $NO_2$ for the proposed application.

What is claimed is:

1. In an occupant carrying vehicle having an occupant carrying location and structure spaced from the location, and further having a crash restraint inflatable so disposed and mounted in said vehicle that upon being inflated the inflatable is positioned between said structure and said occupant carrying location to protect an occupant in said location from impact with said structure, a system adapted to inflate said inflatable, said system comprising:
   a. structure defining
      1. a primary nitrogen generating zone arranged to discharge gaseous products along a predetermined downstream path;
      2. a secondary oxygen generating zone arranged to receive said gaseous products from said primary zone and provide a gaseous discharge on a downstream path; and
      3. a tertiary zone to receive gaseous discharge from said primary and secondary zone and adapted to direct discharge therefrom to inflate the inflatable;
   b. a primary nitrogen generating composition located in said primary zone and comprising an inorganic azide and an oxidizer which reacts with the inorganic azide to form free nitrogen and at least one other combustion product, said oxidizer being selected from a group consisting of inorganic oxidizers, halocarbons and mixtures thereof;

c. a secondary oxygen generating composition in said secondary zone to generate free oxygen which mixes with said primary combustion products to form a gas mixture of nitrogen, oxygen and at least one other combustion product, said oxygen generating composition being selected from a group consisting of metal chlorates, perchlorates, halogenates, manganates, permanganates, peroxides, superoxides and mixtures thereof, and d. a tertiary composition located in said tertiary zone and arranged to permit passage therethrough of nitrogen and oxygen and to remove at least said other combustion product from the gas mixture, said tertiary composition comprising an acidic oxide.

2. The system as recited in claim 1, wherein said tertiary composition chemically reacts out at least a portion of the other combustion product.

3. The system as recited in claim 1, wherein the tertiary composition mechanically filters out at least a portion of the other combustion product.

4. The system as recited in claim 1, wherein said tertiary composition condenses out at least a portion of the other combustion product.

5. The system as recited in claim 1, wherein said tertiary composition functions to chemically react out, filter out and condense out at least a substantial portion of said other combustion product.

6. The system as recited in claim 1, wherein said metal azide is selected from a group consisting of alkali metal azides, alkaline earth metal azides and mixtures thereof.

7. The system as recited in claim 6, wherein said azide is essentially sodium azide.

8. The system as recited in claim 6, wherein said oxidizer comprises a metal perchlorate.

9. The system as recited in claim 8, wherein said metal perchlorate is essentially potassium perchlorate.

10. The system as recited in claim 1, wherein said oxygen generating composition is essentially potassium permanganate.

11. The system as recited in claim 1, wherein said oxygen generating composition comprises a metal chlorate and a fuel.

12. The system as recited in claim 1, wherein
a. said nitrogen generating composition comprises an azide selected from a group consisting of alkali metal azides, alkaline earth metal azides and mixtures thereof, and
b. said tertiary composition is at least partly made up of an acidic oxide.

13. The system as recited in claim 1, wherein at least a portion of said tertiary composition is selected from a gorup consisting of silicon oxide, aluminum oxide, cupric oxide, boric oxide and mixtures thereof.

14. The system as recited in claim 12, wherein said tertiary composition comprises silicon oxide.

15. The system as recited in claim 12, wherein said tertiary composition comprises cupric oxide.

16. The system as recited in claim 12, wherein said tertiary composition comprises aluminum oxide.

17. The system as recited in claim 12, wherein said tertiary composition comprises boric oxide.

18. The system as recited in claim 1, wherein said metallic azide is essentially sodium azide, and said oxidizer is essentially metal perchlorate.

19. The system as recited in claim 18, wherein said secondary oxygen generating composition comprises a metal chlorate and a fuel.

20. In the system as recited in claim 1, wherein said primary nitrogen generating composition is located in a plurality of primary subzones, and said secondary oxygen generating composition is located in a plurality of secondary subzones, and said primary and secondary subzones are intermixed with one another.

21. The system as recited in claim 20, wherein said primary nitrogen generating composition is arranged in pellets, said secondary oxygen generating composition is arranged in pellets, and said primary nitrogen generating composition pellets and said secondary oxygen generating composition pellets are intermixed with one another.

22. The system as recited in claim 1, wherein there is restricted flow means downstream of said primary nitrogen generating zone.

23. The system as recited in claim 20, wherein said restricted flow means comprises a perforate plate.

24. The system as recited in claim 23, wherein said perforate plate is between said parmary zone and said secondary zone.

25. The system as recited in claim 1, wherein said tertiary composition is formed as a porous monolithic bed.

26. The system as recited in claim 25, therein said porous monolithic bed comprises aluminum oxide coated with boric oxide.

27. The system as recited in claim 1, wherein there is a mechanical filter downstream of said tertiary composition.

28. The system as recited in claim 27, wherein said mechanical filter has a tacky coating thereon to filter out solid particles from said primary composition.

29. The system as recited in claim 1, wherein there is a perforate plate downstream of said primary nitrogen generating zone and there is a diaphragm means closing perforations in said perforate plate.

30. The system as recited in claim 1, wherein said tertiary chamber has an uneven interior wall surface, whereby proper flow through said tertiary chamber is enhanced.

31. The system as recited in claim 1, wherein there is destructable sheet means separating at least two zones from one another.

32. The system as recited in claim 1, wherein there is a flexible cushioning pad means in at least one of said primary and secondary zones whereby breaking and abrasion of said composition pellets is alleviated.

33. In an occupant carrying vehicle having an occupant carrying location and structure spaced from the location, and further having a crash restraint inflatable so disposed and mounted in said vehicle that upon being inflated the inflatable is positioned between said structure and said occupant carrying location to protect an occupant in said location from impact with said structure, a system adapted to inflate said inflatable, said system comprising:
a. structure defining
1. a primary nitrogen generating zone arranged to discharge gaseous products along a predetermined downstream path;
2. a secondary oxygen generating zone arranged to receive said gaseous products from said primary zone and provide a gaseous discharge on a downstream path, b. a primary nitrogen generating composition located in said primary zone and comprising a metal azide and an oxidizer which reacts with the metal azide to form free nitrogen, said oxidizer being selected from a group consisting of inorganic oxidizers, halocarbons and mixtures thereof, and c. a secondary oxygen generating composition in said secondary zone to generate free oxygen which mixes with said free nitrogen to form a gas mixture of nitrogen and oxygen, said oxygen generating composition being selected from a group consisting of metal chlorates, perchlorates, halogenates, manganates, permanganates, peroxides, superoxides and mixtures thereof.

34. The system as recited in claim 33, wherein said azide is selected from a group consisting of alkali metal azides, alkaline earth metal azides and mixtures thereof.

35. The system as recited in claim 34, wherein said azide is essentially sodium azide.

36. The system as recited in claim 33, wherein said oxidizer is selected from a group consisting of metal perchlorates, metal chlorates, chlorocarbons, metal chlorides, and mixtures thereof.

37. The system as recited in claim 36, wherein said oxidizer comprises a metal perchlorate.

38. The system as recited in claim 37, wherein said metal perchlorate is essentially potassium perchlorate.

39. The system as recited in claim 33, wherein said oxygen generating composition is essentially potassium permanganate.

40. The system as recited in claim 33, wherein said oxygen generating composition comprises a metal chlorate and a fuel.

41. The system as recited in claim 33, wherein said primary nitrogen generating composition is located in a plurality of primary subzones, said secondary oxygen generating composition is located in a plurality of secondary subzones, and said primary and secondary subzones are intermixed with one another.

42. The system as recited in claim 41, wherein said primary nitrogen generating composition is arranged in pellets, said secondary oxygen generating composition is arranged in pellets, and said primary nitrogen generating composition pellets and said secondary oxygen generating composition pellets are intermixed with one another.

43. The system as recited in claim 33, wherein there is restricted flow means downstream of said primary nitrogen generating zone.

44. The system as recited in claim 43, wherein said restricted flow means comprises a perforate plate.

45. The system as recited in claim 44, wherein said perforate plate is between said primary zone and said secondary zone.

* * * * *